United States Patent [19]

Watanabe et al.

[11] Patent Number: 4,608,173

[45] Date of Patent: Aug. 26, 1986

[54] FILTER

[75] Inventors: Koh Watanabe, Tokyo; Michihide Tokashiki, Saitama; Sadao Wada, Shiki, all of Japan

[73] Assignee: Toa Nenryo Kogyo Kabushiki Kaisha, Tokyo, Japan

[21] Appl. No.: 742,269

[22] Filed: Jun. 7, 1985

Related U.S. Application Data

[63] Continuation of Ser. No. 448,110, Dec. 9, 1982, abandoned.

[30] Foreign Application Priority Data

Dec. 11, 1981 [JP] Japan ............................ 56-198471

[51] Int. Cl.⁴ .................. B01D 39/08; B01D 39/16
[52] U.S. Cl. ................................ 210/502.1; 55/524; 55/528; 210/507; 210/508
[58] Field of Search ............... 210/496, 500.2, 502, 210/504, 505, 508, 507; 55/524, 528

[56] References Cited

U.S. PATENT DOCUMENTS

| | | | |
|---|---|---|---|
| 2,563,897 | 8/1951 | Wilson et al. | 210/508 |
| 2,738,074 | 3/1956 | Valente | 210/508 |
| 3,158,532 | 11/1964 | Pall et al. | 210/504 |
| 3,463,689 | 8/1969 | Palmai | 210/508 |

FOREIGN PATENT DOCUMENTS 56-30638 9/1982 Japan .

*Primary Examiner*—Ivars Cintins
*Attorney, Agent, or Firm*—R. L. Graham; J. F. Hunt

[57] ABSTRACT

A filter of a nonwoven fabric capable of removing particles from a fluid has attached to the fibers of said fabric a polymeric substance having a functional group capable of adsorbing said particles. In a preferred embodiment the filter is used to remove carbonaceous particles from a hydrocarbon liquid.

6 Claims, No Drawings

4,608,173

FILTER

This is a continuation of application Ser. No. 448,110, filed Dec. 9, 1982, now abandoned.

BACKGROUND OF THE INVENTION

The present invention relates to a filter which is improved in the performance of filtering fine particles. In one aspect, the invention relates to a filter made from nonwoven fabric.

Heretofore, woven fabric and nonwoven fabric have been used as filter media. Because of its unique structure, nonwoven fabric is more effective in removing fine particles in a gas and liquid than woven fabric. Being formed by bonding or entangling fibers mechanically, chemically, and/or thermally, the nonwoven fabric has randomly arranged gaps among fibers.

Nonwoven fabric filters are prepared by a variety of techniques which include the following:

(1) combining nonwoven fabrics of different thickness and density,
(2) converting the needle punch surface of a nonwoven fabric of specific density into a filmy state,
(3) forming a coarse part and a compact part in the same nonwoven fabric, or
(4) imparting a density gradient in the thickness direction.

Filtration by the filters produced by these techniques is achieved by a physical mechanism which involves either deposition of comparatively large particles on the surface of nonwoven fabric or the accumulation of particles across the entire thickness. These filters, however, are not capable of filtering out extremely fine particles in the range of from 0.05 to 1 $\mu m$; such fine particles pass through the clearance, and openings among fibers.

SUMMARY OF THE INVENTION

Surprisingly, it has been discovered that by providing the nowoven fibers of a filter for removing particles (e.g. carbonaceous particles) with a functional polymeric substance capable of adsorbing such particles, the filtering mechanism is aided by particle adsorption and permits the removal of finer particles than was possible with prior nonwoven filters.

DESCRIPTION OF THE PREFERRED EMBODIMENTS

The nonwoven fabric used in this invention is made of synthetic fibers such as polyolefin, polyamide, and polyester, and cotton fibers. A preferred nonwoven fabric is made of polyamide fibers. The fibers constituting the nonwoven fabric have a diameter from 0.5 to 10 $\mu m$, prefrably from 2 to 8 $\mu m$, and the fabric has a bulk density of 0.15 to 0.40 grams/cc.

The nonwoven fabrics are produced by the wet process in which staple fibers are dispersed in water and the dispersion is poured out on screens on which the water is extracted and the fibers are formed into a web with a binder, or by the dry process in which fibers are formed into a web by carding and then bonded together or entangled together by needle punching or mechanical method such as high-pressure water stream. In the spun bond process, nonwoven fabric is made directly from a raw material; that is, a synthetic resin is made into fibers by melt spinning or solution spinning and thus prepared fibers are immediately formed into a sheet continuously and the sheet undergoes thermal, mechanical, or chemical treatment for fiber-to-fiber bonding. Nonwoven fabric for the filter of this invention should preferably be produced by the jet spinning process or melt blown process as disclosed in Japanese Patent Publication Nos. 25871/1969, 48921/1974, and 46972/1975. According to these processes, a heated, molten synthetic resin as the raw material is extruded from a die having fine holes and the extrudate is blown by the high-speed air stream for stretching and the blown fibers are collected on a moving collecting device. Thus, nonwoven fabric composed of extremely fine fibers is prepared. The nonwoven fabric may further undergo needle punching.

The functional polymeric substance used in this invention includes such polymers as polyacrylamide and polyvinylpyrolidone which contain amide and lactam as the functional group; such polymers as polyvinyl methyl ether which contain an ether group as the functional group; and such carboxyl group-containing copolymers as maleic acid-isobutylene copolymer which contain maleic acid, funmaric acid, acrylic acid, methacrylic acid, or itaconic acid, and other comonomer; and anion-modified or cation-modified products thereof. Preferably among these functional polymeric substances is polyacrylamide or polyvinylpyrolidone, and more preferable is cationic polyacrylamide.

The functional polymeric substance may be attached to the nonwoven fabric in any manner. In one way, the nonwoven fabric is dipped in or sprayed with an aqueous solution containing 0.1 to 20 wt% of the functional polymeric substance, followed by drying.

As shown in Example 5, the filter of this invention is capable of filtering out extremely fine particles which cannot be caught by the conventional physical filtration accomplished by accumulating particles on the surface of or in the entire thickness of the non-woven fabric. This filtering capability derives from the adsorption of particles on the fibers. Thus, the filter of this invention is effective for filtering out fine particles in oil, hydrocarbon gas, and air. It will find use as engine oil filters, air filters, industrial filters, and masks for those who are engaged in industry, transportation, and medical service.

The invention will be described with reference to the following examples.

EXAMPLE 1

A filter was prepared by dipping a polypropylene nonwoven fabric having an average fiber diameter of 5 $\mu m$ and a basis weight of 200 g/m$^2$ (0.7 mm thick), which was prepared by the melt blown process, in a 1 wt% aqueous solution of cationic polyacrylamide ("Diaclear" MK-4600, a product of Mitsubishi Kasei Co., Ltd.), followed by drying.

With this filter (filtering area of 10.2 cm$^2$) clamped in a suction filter, 100 g of used lubricating oil (containing 4.5 wt% of soot) of an automotive diesel engine was filtered at 100° C. After filtration, the filter was washed with petroleum ether and dried. The soot caught by the filter was 38 mg.

For the purpose of comparison, the above experiment was repeated except that the polypropylene nonwoven fabric was not treated with cationic polyacrylamide. The soot caught by this filter was 0.2 mg.

EXAMPLE 2

A filter with cationic polyacrylamide attached thereto was prepared as in Example 1 from a cotton nonwoven fabric having an average fiber diameter of 7 μm and a thickness of 5 mm. Using this filter, the same diesel engine oil as used in Example 1 was filtered. The soot caught by the filter was 43 mg.

For the purpose of comparison, the above experiment was repeated except that the cotton nonwoven fabric was not treated with cationic polyacrylamide. The soot caught by this filter was 2.0 mg.

EXAMPLE 3

A filter with cationic polyacrylamide attached thereto was prepared as in Example 1 from a melt blown nylon nonwoven fabric having an average fiber diameter of 5 μm and a basis weight of 200 g/m$^2$ (1.0 mm thick). Using this filter, the same diesel engine oil as used in Example 1 was filtered. The soot caught by this filter was 56 mg.

For the purpose of comparison, the above experiment was repeated except that the nylon nonwoven fabric was not treated with cationic polyacrylamide. The soot caught by this filter was 8.0 mg.

EXAMPLE 4

A filter with cationic polyacrylamide attached thereto was prepared as in Example 1 from a melt blown nylon nonwoven fabric having an average fiber diameter of 4 μm and a basis weight of 250 g/m$^2$ (1.5 mm thick). Using this filter, 0.1 m$^3$ of air containing carbon black having an average particle diameter of 0.4 μm was filtered. The carbon black caught by the filter was 25 mg.

For the purpose of comparison, the above experiment was repeated except that the nylon nonwoven fabric was not treated with cationic polyacrylamide. The carbon black caught by this filter was 5 mg.

EXAMPLE 5

Using lubricating oil of an automotive diesel engine was filtered at normal temperature by the nylon nonwoven fabric and the nylon nonwoven fabric treated with cationic polyacrylamide as in Example 3. After filtration, the filters were examined with an electron microscope at a magnification of 10,000 with gold deposit. It was observed that substantially more particles were caught in the nylon nonwoven fabric treated with cationic polyacrylamide than in the nylon nonwoven fabric alone. The filter of this invention is demonstrably superior in the filtering effect.

What is claimed is:

1. A filter for removing carbonaceous particles from oil, gas, or air which comprises a fabric composed of (a) a plurality of nonwoven fibers having a composition selected from the group consisting of polymers and cotton, and having a diameter between about 0.5 and 10 micrometers, and being randomly entangled to provide a filter media, and (b) a cationic polyacrylamide coating on said fibers for adsorbing and filtering said particles in said oil, gas, or air.

2. The filter as defined in claim 1 wherein the fabric is made by extruding a molten resin from a die having a plurality of fine openings and blowing the molten fibers with an air stream sufficient to stretch the fibers, and collecting the fibers to form the fabric.

3. The filter as defined in claim 2 wherein the resin is a polyolefin, polyamide, or polyester.

4. The filter as defined in claim 2 wherein the nonwoven fibers are composed of polypropylene and wherein the filter media has a bulk density between about 0.15 and 0.40 grams per cubic centimeter.

5. The filter as defined in claim 4 wherein the cationic polyacrylamide is attached to the fibers as a aqueous solution containing from about 0.1 to 20 wt% of the functional polymeric substance, followed by drying.

6. The filter as defined in claim 2 wherein the fabric is composed of a polyolefin or nylon fibers and the cationic polyacrylamide is attached to the fibers as an aqueous solution followed by drying.

* * * * *